(12) United States Patent
Seo et al.

(10) Patent No.: US 7,693,394 B2
(45) Date of Patent: Apr. 6, 2010

(54) RECORDING MEDIUM HAVING DATA STRUCTURE FOR MANAGING REPRODUCTION OF DATA STREAMS RECORDED THEREON AND RECORDING AND REPRODUCING METHODS AND APPARATUSES

(75) Inventors: Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1190 days.

(21) Appl. No.: 10/766,238

(22) Filed: Jan. 29, 2004

(65) Prior Publication Data

US 2004/0184768 A1 Sep. 23, 2004

(30) Foreign Application Priority Data

Feb. 26, 2003 (KR) ...................... 10-2003-0012114

(51) Int. Cl.
*G11B 27/00* (2006.01)
(52) U.S. Cl. ......................................... 386/55; 386/124
(58) Field of Classification Search .................. 386/46, 386/125, 126, 55; 375/240.75, 240
See application file for complete search history.

(56) References Cited

U.S. PATENT DOCUMENTS

| | | | |
|---|---|---|---|
| 5,517,250 A * | 5/1996 | Hoogenboom et al. | 375/240.27 |
| 5,521,898 A | 5/1996 | Ogasawara | |
| 5,583,652 A | 12/1996 | Ware | |
| 5,602,956 A | 2/1997 | Suzuki et al. | |
| 5,630,006 A | 5/1997 | Hirayama et al. | |
| 5,633,839 A | 5/1997 | Alexander et al. | |
| 5,691,972 A | 11/1997 | Tsuga et al. | |
| 5,703,997 A | 12/1997 | Kitamura et al. | |
| 5,734,788 A | 3/1998 | Nonomura et al. | |
| 5,742,569 A | 4/1998 | Yamamoto et al. | |
| 5,784,528 A | 7/1998 | Yamane et al. | |
| 5,881,203 A | 3/1999 | Fujinami et al. | |
| 5,884,004 A | 3/1999 | Sato et al. | |
| 5,913,010 A | 6/1999 | Kaneshige et al. | |
| 5,917,781 A | 6/1999 | Kim | |
| 5,923,869 A | 7/1999 | Kashiwagi et al. | |
| 5,933,410 A | 8/1999 | Nakane et al. | |

(Continued)

FOREIGN PATENT DOCUMENTS

CN 1212427 3/1999

(Continued)

OTHER PUBLICATIONS

Taiwanese Patent and Trademark Office Action dated Oct. 17, 2007 and English language translation thereof for corresponding Taiwanese Patent Application No. 93103389.

(Continued)

*Primary Examiner*—Thai Tran
*Assistant Examiner*—Mishawn Dunn
(74) *Attorney, Agent, or Firm*—Harness, Dickey & Pierce, P.L.C.

(57) ABSTRACT

The data structure on the recording medium includes a navigation area storing at least one playitem in a playlist. The playitem includes a stream indication field indicating the data streams associated with the playitem. For example, the stream indication field indicates the packet identifiers of the data streams associated with the playitem.

18 Claims, 6 Drawing Sheets

U.S. PATENT DOCUMENTS

| | | | |
|---|---|---|---|
| 5,953,290 A | 9/1999 | Fukuda et al. |
| 5,999,694 A | 12/1999 | Yasuda et al. |
| 5,999,698 A | 12/1999 | Nakai et al. |
| 6,009,234 A | 12/1999 | Taira et al. |
| 6,014,495 A | 1/2000 | Moriyama et al. |
| 6,064,385 A | 5/2000 | Sturgeon et al. |
| 6,064,796 A | 5/2000 | Nakamura et al. |
| 6,067,400 A | 5/2000 | Saeki et al. |
| 6,084,581 A | 7/2000 | Hunt |
| 6,097,676 A | 8/2000 | Fujinami |
| 6,118,927 A | 9/2000 | Kikuchi et al. |
| 6,130,869 A | 10/2000 | Tokoro et al. |
| 6,167,189 A | 12/2000 | Taira et al. |
| 6,215,746 B1 | 4/2001 | Ando et al. |
| 6,219,488 B1 | 4/2001 | Mori et al. |
| 6,247,022 B1 | 6/2001 | Yankowski |
| 6,285,825 B1 | 9/2001 | Miwa et al. |
| 6,292,226 B1 | 9/2001 | Yamanaka et al. |
| 6,308,005 B1 | 10/2001 | Ando et al. |
| 6,321,027 B2 | 11/2001 | Honjo |
| 6,336,002 B1 | 1/2002 | Yamauchi et al. |
| 6,356,971 B1 | 3/2002 | Katz et al. |
| 6,360,055 B1 | 3/2002 | Kaneshige et al. |
| 6,373,803 B2 | 4/2002 | Ando et al. |
| 6,377,474 B1 | 4/2002 | Archambeault et al. |
| 6,377,518 B1 | 4/2002 | Auwens et al. |
| 6,377,747 B1 | 4/2002 | Murase et al. |
| 6,385,388 B1 | 5/2002 | Lewis et al. |
| 6,392,969 B1 | 5/2002 | Heo |
| 6,393,430 B1 | 5/2002 | Van Ryzin |
| 6,415,101 B1 | 7/2002 | deCarmo et al. |
| 6,424,793 B1 | 7/2002 | Setogawa et al. |
| 6,424,797 B1 | 7/2002 | Murase et al. |
| 6,532,334 B1 | 3/2003 | Kikuchi et al. |
| 6,570,837 B1 | 5/2003 | Kikuchi et al. |
| 6,580,870 B1 * | 6/2003 | Kanazawa et al. | 386/95 |
| 6,584,277 B2 | 6/2003 | Tsumagari et al. |
| 6,615,192 B1 | 9/2003 | Tagawa et al. |
| 6,647,496 B1 | 11/2003 | Tagawa et al. |
| 6,700,839 B1 | 3/2004 | Auflick et al. |
| 6,727,421 B2 | 4/2004 | Izawa et al. |
| 6,763,345 B1 | 7/2004 | Hempleman et al. |
| 6,766,103 B2 | 7/2004 | Kim et al. |
| 6,782,192 B1 | 8/2004 | Tanaka et al. |
| 6,795,499 B1 | 9/2004 | Kato et al. |
| 6,798,981 B1 | 9/2004 | Yamauchi et al. |
| 6,832,293 B1 | 12/2004 | Tagawa et al. |
| 6,859,421 B2 | 2/2005 | Sawabe et al. |
| 6,904,227 B1 | 6/2005 | Yamamoto et al. |
| 6,912,218 B1 | 6/2005 | Jeon |
| 6,914,863 B2 | 7/2005 | Ono |
| 6,965,727 B1 | 11/2005 | Sawabe et al. |
| 6,999,674 B1 | 2/2006 | Hamada et al. |
| 7,006,758 B1 | 2/2006 | Yamamoto et al. |
| 7,050,384 B2 | 5/2006 | Sasaki |
| 7,065,287 B1 | 6/2006 | Heredia et al. |
| 7,113,694 B2 | 9/2006 | Kim et al. |
| 7,236,687 B2 | 6/2007 | Kato et al. |
| 2001/0014070 A1 | 8/2001 | Ando et al. |
| 2001/0026679 A1 | 10/2001 | Koshino et al. |
| 2001/0030710 A1 | 10/2001 | Werner |
| 2001/0031127 A1 | 10/2001 | Honjo |
| 2001/0036358 A1 | 11/2001 | Kim et al. |
| 2001/0043790 A1 | 11/2001 | Saeki et al. |
| 2001/0053280 A1 | 12/2001 | Yamauchi et al. |
| 2002/0018416 A1 | 2/2002 | Heo |
| 2002/0041557 A1 | 4/2002 | Heo |
| 2002/0046328 A1 | 4/2002 | Okada |
| 2002/0093556 A1 | 7/2002 | Ishizawa et al. |
| 2002/0093886 A1 | 7/2002 | Ijichi et al. |
| 2002/0106196 A1 | 8/2002 | Yamauchi et al. |
| 2002/0126994 A1 | 9/2002 | Gunji et al. |
| 2002/0129036 A1 | 9/2002 | Ho Yuen Lok et al. |
| 2002/0135608 A1 | 9/2002 | Hamada et al. |
| 2002/0145702 A1 | 10/2002 | Kato et al. |
| 2002/0159368 A1 | 10/2002 | Noda et al. |
| 2002/0177914 A1 | 11/2002 | Chase |
| 2002/0180803 A1 | 12/2002 | Kaplan et al. |
| 2002/0191963 A1 | 12/2002 | Kikuchi et al. |
| 2002/0196365 A1 | 12/2002 | Cho et al. |
| 2003/0035681 A1 | 2/2003 | Ho |
| 2003/0058948 A1 | 3/2003 | Kelly et al. |
| 2003/0103604 A1 | 6/2003 | Kato et al. |
| 2003/0118327 A1 | 6/2003 | Um et al. |
| 2003/0123346 A1 | 7/2003 | Ishii et al. |
| 2003/0123845 A1 | 7/2003 | Koda et al. |
| 2003/0147322 A1 | 8/2003 | Ono |
| 2003/0161615 A1 | 8/2003 | Tsumagari et al. |
| 2003/0235404 A1 | 12/2003 | Seo et al. |
| 2004/0019396 A1 | 1/2004 | McMahon et al. |
| 2004/0047588 A1 | 3/2004 | Okada et al. |
| 2004/0047591 A1 | 3/2004 | Seo et al. |
| 2004/0076402 A1 | 4/2004 | Jung et al. |
| 2004/0114908 A1 | 6/2004 | Ito |
| 2004/0141436 A1 * | 7/2004 | Monahan | 369/47.24 |
| 2004/0156621 A1 | 8/2004 | Seo et al. |
| 2004/0208135 A1 | 10/2004 | Nakamura et al. |
| 2004/0213105 A1 | 10/2004 | Seo et al. |
| 2004/0220791 A1 | 11/2004 | Lamkin et al. |
| 2005/0019007 A1 * | 1/2005 | Kato et al. | 386/69 |
| 2005/0025459 A1 | 2/2005 | Kato et al. |
| 2005/0036763 A1 | 2/2005 | Kato et al. |
| 2006/0013564 A1 | 1/2006 | Hamada et al. |
| 2006/0110132 A1 | 5/2006 | Takakuwa et al. |
| 2006/0222340 A1 | 10/2006 | Yamauchi et al. |

FOREIGN PATENT DOCUMENTS

| | | |
|---|---|---|
| CN | 1220458 | 6/1999 |
| CN | 1239574 | 12/1999 |
| CN | 1272209 | 11/2000 |
| CN | 1310445 | 8/2001 |
| CN | 1317200 | 10/2001 |
| CN | 1320926 | 11/2001 |
| CN | 1346491 | 4/2002 |
| CN | 1393872 | 1/2003 |
| CN | 1251680 | 8/2003 |
| CN | 1205793 | 11/2003 |
| CN | 1163673 | 6/2004 |
| CN | 1509572 | 6/2004 |
| CN | 1263345 | 9/2004 |
| CN | 1555058 | 12/2004 |
| CN | 1571055 | 1/2005 |
| CN | 1606355 | 4/2005 |
| CN | 1606356 | 4/2005 |
| CN | 1606357 | 4/2005 |
| CN | 1611071 | 4/2005 |
| CN | 1364387 | 11/2005 |
| CN | 1383679 | 1/2006 |
| EP | 0 676 755 | 4/1995 |
| EP | 0 737 980 | 4/1996 |
| EP | 0723216 | 7/1996 |
| EP | 0724264 | 7/1996 |
| EP | 0737009 | 10/1996 |
| EP | 0831647 | 3/1998 |
| EP | 0836183 | 4/1998 |
| EP | 0836189 | 4/1998 |
| EP | 0858073 | 8/1998 |
| EP | 0872839 | 10/1998 |
| EP | 0949622 | 10/1999 |
| EP | 1126454 | 7/2000 |
| EP | 1024494 | 8/2000 |
| EP | 1050880 | 11/2000 |
| EP | 1280348 | 4/2001 |

| | | |
|---|---|---|
| EP | 1103974 | 5/2001 |
| EP | 1041565 | 9/2001 |
| EP | 1148503 | 10/2001 |
| EP | 1041569 | 1/2002 |
| EP | 1198132 | 4/2002 |
| EP | 1198133 | 4/2002 |
| EP | 1 205 933 | 5/2002 |
| EP | 1469677 | 10/2002 |
| EP | 1 271 526 | 1/2003 |
| EP | 1398965 | 3/2004 |
| EP | 1391119 | 6/2006 |
| JP | 08-273304 | 10/1996 |
| JP | 09-135421 | 5/1997 |
| JP | 10-040667 | 2/1998 |
| JP | 11-69308 | 3/1999 |
| JP | 11-69309 | 3/1999 |
| JP | 11-96653 | 4/1999 |
| JP | 11-120747 | 4/1999 |
| JP | 10-032780 | 6/1999 |
| JP | 11-161663 | 6/1999 |
| JP | 11-213522 | 8/1999 |
| JP | 11-213627 | 8/1999 |
| JP | 11-259985 | 9/1999 |
| JP | 2002-150685 | 9/1999 |
| JP | 1999-296997 | 10/1999 |
| JP | 2000-021130 | 1/2000 |
| JP | 2000-067522 | 3/2000 |
| JP | 2000-149405 | 5/2000 |
| JP | 2000-195235 | 7/2000 |
| JP | 2000-222822 | 8/2000 |
| JP | 2000-235779 | 8/2000 |
| JP | 2000-235780 | 8/2000 |
| JP | 12-331466 | 11/2000 |
| JP | 2000-322827 | 11/2000 |
| JP | 2000-348442 | 12/2000 |
| JP | 2001-024985 | 1/2001 |
| JP | 2001-157145 | 6/2001 |
| JP | 2001-157208 | 6/2001 |
| JP | 2001-169246 | 6/2001 |
| JP | 3199243 | 6/2001 |
| JP | 3199711 | 6/2001 |
| JP | 2001-195809 | 7/2001 |
| JP | 2001-332006 | 11/2001 |
| JP | 2001-359072 | 12/2001 |
| JP | 2002-025231 | 1/2002 |
| JP | 2002-082838 | 3/2002 |
| JP | 2002-083486 | 3/2002 |
| JP | 2002-158972 | 5/2002 |
| JP | 2002-158974 | 5/2002 |
| JP | 3392838 | 5/2002 |
| JP | 2002-222581 | 8/2002 |
| JP | 2002-112201 | 12/2002 |
| JP | 2002-352515 | 12/2002 |
| JP | 3379961 | 2/2003 |
| JP | 3392849 | 2/2003 |
| JP | 2003-068057 | 3/2003 |
| JP | 2003-199047 | 7/2003 |
| JP | 2003-520514 | 7/2003 |
| JP | 2004-127397 | 4/2004 |
| JP | 2005-513936 | 5/2005 |
| JP | 2005-251392 | 9/2005 |
| KR | 1996-38743 | 11/1996 |
| KR | 1996-38744 | 11/1996 |
| KR | 1996-38901 | 11/1996 |
| KR | 1996-38905 | 11/1996 |
| KR | 1999-0022858 | 3/1999 |
| KR | 1999-0079482 | 11/1999 |
| KR | 2000-0053633 | 8/2000 |
| KR | 2001-0022702 | 3/2001 |
| KR | 2001-0028735 | 4/2001 |
| KR | 2001-0051898 | 6/2001 |
| KR | 2001-0098007 | 11/2001 |
| KR | 2001-0107578 | 12/2001 |
| KR | 2002-0006273 | 1/2002 |
| KR | 2002-0020919 | 3/2002 |
| KR | 2002-0097454 | 12/2002 |
| KR | 2002-0097455 | 12/2002 |
| RU | 2229174(C2) | 5/2004 |
| WO | WO 97/13366 | 4/1997 |
| WO | WO 97/14151 | 4/1997 |
| WO | WO 97/15924 | 5/1997 |
| WO | WO 97/37491 | 10/1997 |
| WO | WO 97/38527 | 10/1997 |
| WO | WO 97/39451 | 10/1997 |
| WO | WO99/08281 | 2/1999 |
| WO | WO99/38169 | 7/1999 |
| WO | WO 00/46803 | 8/2000 |
| WO | WO00/60597 | 10/2000 |
| WO | WO 01/35648 | 5/2001 |
| WO | WO01/52554 | 7/2001 |
| WO | WO01/82604 | 11/2001 |
| WO | WO01/82606 | 11/2001 |
| WO | WO01/82610 | 11/2001 |
| WO | WO 02/075739 | 9/2002 |
| WO | WO02/080541 | 10/2002 |
| WO | WO03/047261 | 6/2003 |
| WO | WO03/058957 | 7/2003 |
| WO | WO04/001728 | 12/2003 |
| WO | WO 04/001748 | 12/2003 |
| WO | WO 04/001750 | 12/2003 |
| WO | WO 04/001752 | 12/2003 |
| WO | WO04/001753 | 12/2003 |
| WO | WO04/001754 | 12/2003 |
| WO | WO 2004/032142 | 4/2004 |
| WO | WO 2004/047100 | 6/2004 |
| WO | WO 2004/088661 | 10/2004 |
| WO | WO 2004/093064 A1 | 10/2004 |
| WO | WO 2005/067399 | 7/2005 |

OTHER PUBLICATIONS

Japanese Office Action dated May 7, 2008.
United States Office Action dated May 15, 2008.
United States Office Action dated May 21, 2008.
United States Office Action dated Apr. 4, 2008.
United States Patent Office Action dated May 14, 2008 for a counterpart U.S. patent application.
Japanese Patent Office Action dated May 20, 2008 for a counterpart Japanese patent application.
Japanese Patent Office Action dated Jun. 20, 2008.
Japanese Patent Office Action dated Jun. 27, 2008.
European Search Report dated Sep. 12, 2008.
Japanese Patent Office Action dated Sep. 16, 2008.
Australian Patent Office Action dated Sep. 11, 2008.
Australian Patent Office Action dated Sep. 17, 2008.
Notice of Allowance dated Jan. 27, 2009 cited by the Russian Patent Office.

* cited by examiner

RECORDING MEDIUM HAVING DATA STRUCTURE FOR MANAGING REPRODUCTION OF DATA STREAMS RECORDED THEREON AND RECORDING AND REPRODUCING METHODS AND APPARATUSES

FOREIGN PRIORITY

The present invention claims priority under 35 U.S.C. 119 on Korean Application No. 10-2003-012114 filed Feb. 26, 2003; the contents of which are incorporated by reference in their entirety.

BACKGROUND OF THE INVENTION

1. Field of the Invention

The present invention relates to a recording medium having a data structure for managing reproduction of data streams recorded thereon as well as methods and apparatuses for reproduction and recording.

2. Description of the Related Art

The standardization of new high-density read only and rewritable optical disks capable of recording large amounts of high-quality video and audio data has been progressing rapidly and new optical disk related products are expected to be commercially available on the market in the near future. The Blu-ray Disc Rewritable (BD-RE) is one example of these new optical disks.

Figure 1:
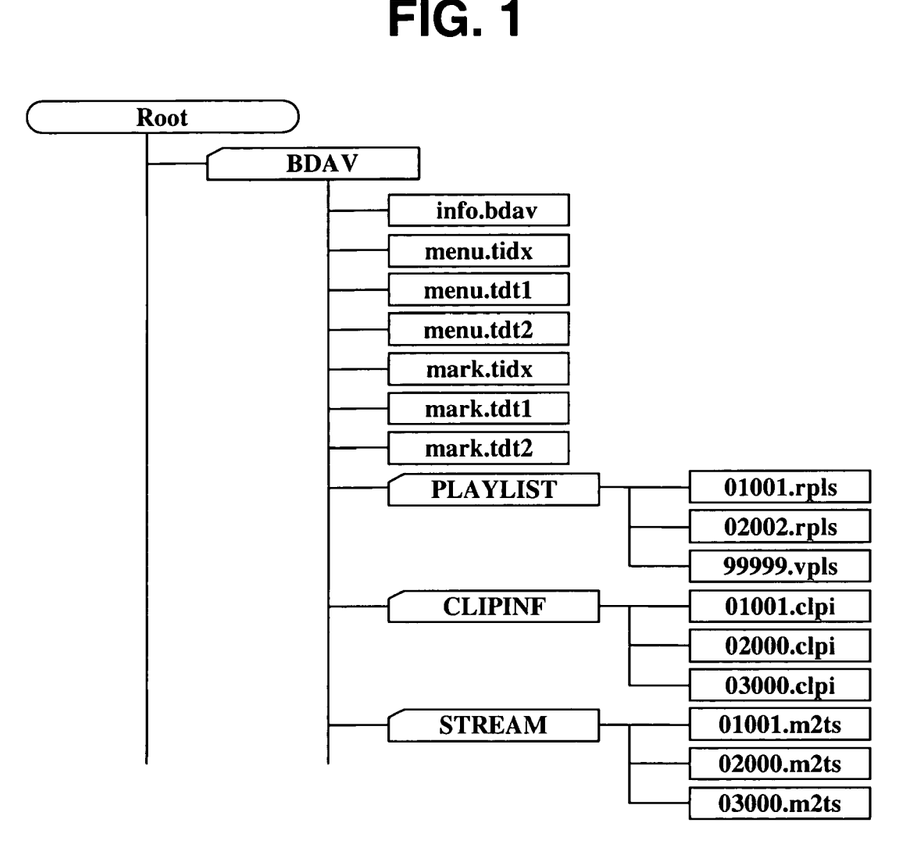
FIG. 1 illustrates the prior art file or data structure of a rewritable optical disk according to the Blu-ray Disc Rewritable (BD-RE) standard.

FIG. 1 illustrates the file structure of the BD-RE. The file structure or data structure provides for managing the reproduction of the video and audio data recorded on the BD-RE. As shown, the data structure includes a root directory that contains at least one BDAV directory. The BDAV directory includes files such as 'info.bdav', 'menu.tidx', and 'mark.tidx', a PLAYLIST subdirectory in which playlist files (*.rpls and *.vpls) are stored, a CLIPINF subdirectory in which clip information files (*.clpi) are stored, and a STREAM subdirectory in which MPEG2-formatted A/V stream clip files (*.m2ts) corresponding to the clip information files are stored. In addition to illustrating the data structure of the optical disk, FIG. 1 represents the areas of the optical disk. For example, the general information file info.bdav is stored in a general information area or areas on the optical disk.

Because the BD-RE data structure and disk format as illustrated in FIG. 1 is well-known and readily available, only a brief overview of the file structure will be provided in this disclosure.

As alluded to above, the STREAM directory includes MPEG2-formatted A/V stream files called clip files. The STREAM directory may also include a special type of clip referred to as a bridge-clip A/V stream file. A bridge-clip file is used for making seamless connection between two or more presentation intervals selected in the clip files, and generally have a small data size compared to clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips for playback. A playlist file is a collection of playing intervals in the clips. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). Expressed another way, the playlist file identifies playitems, each playitem points to a clip file or portion thereof and identifies the clip information file associated with the clip file. The clip information file is used, among other things, to map the playitems to the clip of source packets.

A playlist directory may include real playlists (*.rpls) and virtual playlists (*.vpls). A real playlist can only use clips and not bridge-clips. Namely, the real playlist is considered as referring to parts of clips, and therefore, conceptually considered equivalent in disk space to the referred to parts of the clips. A virtual playlist can use both clips and bridge-clips, and therefore, the conceptual considerations of a real playlist do not exist with virtual playlists.

The info.bdav file is a general information file that provides general information for managing the reproduction of the A/V stream recorded on the optical disk. More specifically, the info.bdav file includes, among other things, a table of playlists that identifies the file names of the playlist in the PLAYLIST directory of the same BDAV directory.

The menu.tidx, menu.tdt1 and menu.tdt2 files store information related to menu thumbnails. The mark.tidx, mark.tdt1 and mark.tdt2 files store information that relates to mark thumbnails. Because these files are not particularly relevant to the present invention, they will not be discussed further.

The standardization for high-density read-only optical disks such as the Blu-ray ROM (BD-ROM) is still under way. An effective data structure for managing multiple component data recorded on the high-density read-only optical disk such as a BD-ROM is not yet available.

SUMMARY OF THE INVENTION

The recording medium according to the present invention includes a data structure for managing reproduction of data streams recorded on the recording medium.

In one exemplary embodiment, a navigation area of the recording medium stores at least one playitem in a playlist. The playitem includes a stream indication field indicating the data streams associated with the playitem. For example, a data area of the recording medium stores a plurality of data streams, and the stream indication field indicates which of the plurality of data streams are associated with the playitem.

In one exemplary embodiment, the data area stores the plurality of data streams as packetized data streams, and each packet includes a packet identifier (PID). Here, the stream indication field indicates the PIDs of the data streams associated with the playitem.

In one exemplary embodiment, the data streams are elementary data streams, and the elementary data streams are stored as transport streams.

The plurality of data streams, for example, may include video data streams, audio data streams, graphics data streams and/or subtitle data streams.

The present invention further provides apparatuses and methods for recording and reproducing the data structure according to the present invention, and recording and reproducing data streams according to the present invention.

BRIEF DESCRIPTION OF THE DRAWINGS

The above features and other advantages of the present invention will be more clearly understood from the following detailed description taken in conjunction with the accompanying drawings, in which.

DESCRIPTION OF THE EMBODIMENTS

In order that the invention may be fully understood, exemplary embodiments thereof will now be described with reference to the accompanying drawings.

Figure 2:
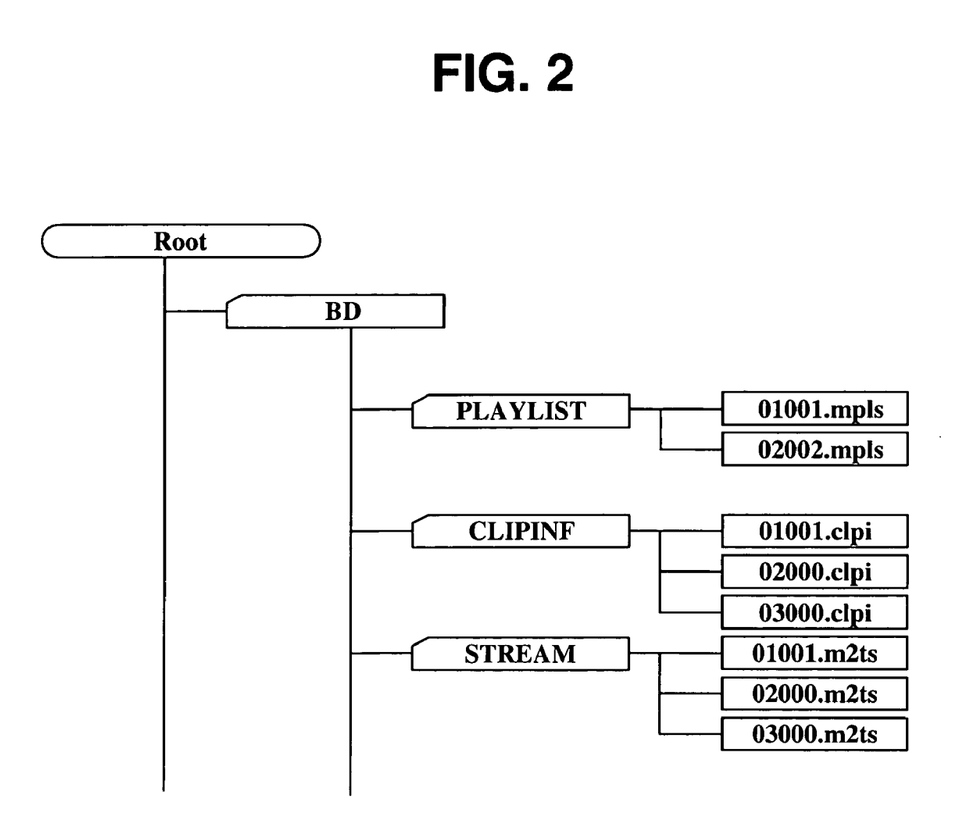
FIG. 2 illustrates an exemplary embodiment of a recording medium file or data structure according to the present invention.

A high-density recording medium such as a high density optical disk, for example, a Blu-Ray ROM (BD-ROM), BD-RE, etc. in accordance with the invention may have a file or data structure for managing reproduction of video and audio data as shown in FIG. 2. Some aspects of the data structure according to the present invention shown in FIG. 2 are the same as the well-known BD-RE standard, as such these aspects will be reviewed, but not described in great detail.

As shown in FIG. 2, the root directory contains at least one BD directory. The BD directory includes general files (not shown), a PLAYLIST directory in which playlist files (e.g., *.mpls) are stored, a CLIPINF directory in which clip information files (*.clpi) are stored, and a STREAM directory in which MPEG2-formatted A/V stream clip files (*.m2ts), corresponding to the clip information files, are stored.

The STREAM directory includes MPEG2-formatted A/V stream files called clip streams files or just clip files. The A/V stream includes source packets of video and audio data. For example, a source packet of video data includes a header and a transport packet. A source packet includes a source packet number, which is generally a sequentially assigned number that serves as an address for accessing the source packet. Transport packets include a packet identifier (PID). The PID identifies the sequence of transport packets to which a transport packet belongs. Each transport packet in the sequence will have the same PID.

The CLIPINF directory includes a clip information file associated with each A/V stream file. The clip information file indicates, among other things, the type of A/V stream associated therewith, sequence information, program information and timing information. The sequence information describes the arrival time basis (ATC) and system time basis (STC) sequences. For example, the sequence information indicates, among other things, the number of sequences, the beginning and ending time information for each sequence, the address of the first source packet in each sequence and the PID of the transport packets in each sequence. A sequence of source packets in which the contents of a program is constant is called a program sequence. The program information indicates, among other things, the number of program sequences, the starting address for each program sequence, and the PID(s) of transport packets in a program sequence.

The timing information is referred to as characteristic point information (CPI). One form of CPI is the entry point (EP) map. The EP map maps a presentation time stamp (e.g., on an arrival time basis (ATC) and/or a system time basis (STC)) to a source packet address (i.e., source packet number). The presentation time stamp (PTS) and the source packet number (SPN) are related to an entry point in the AV stream; namely, the PTS and its related SPN point to an entry point on the AV stream. The packet pointed to is often referred to as the entry point packet.

The PLAYLIST directory includes one or more playlist files. The concept of a playlist has been introduced to promote ease of editing/assembling clips (clip file and associated clip information file) for playback. A playlist file is a collection of playing intervals in the clip files. Each playing interval is referred to as a playitem. The playlist file, among other things, identifies each playitem forming the playlist, and each playitem, among other things, is a pair of IN-point and OUT-point that point to positions on a time axis of the clip file (e.g., presentation time stamps on an ATC or STC basis). The playlist file may also include sub-playitems that also provide a pair of IN-point and OUT-point that point to positions on a time axis of a clip file. Expressed another way, the playlist file identifies playitems and sub-playitems, each playitem or sub-playitem points to a clip file or portion thereof and identifies the clip information file associated with the clip file. The clip information file is used, among other things, to map the playitems to the clip file of source packets. Playlists may also include playlist marks which point to specific places (e.g., a specific address) in a clip file The general information files (not shown) provide general information for managing the reproduction of the A/V streams recorded on the optical disk.

Figure 3:
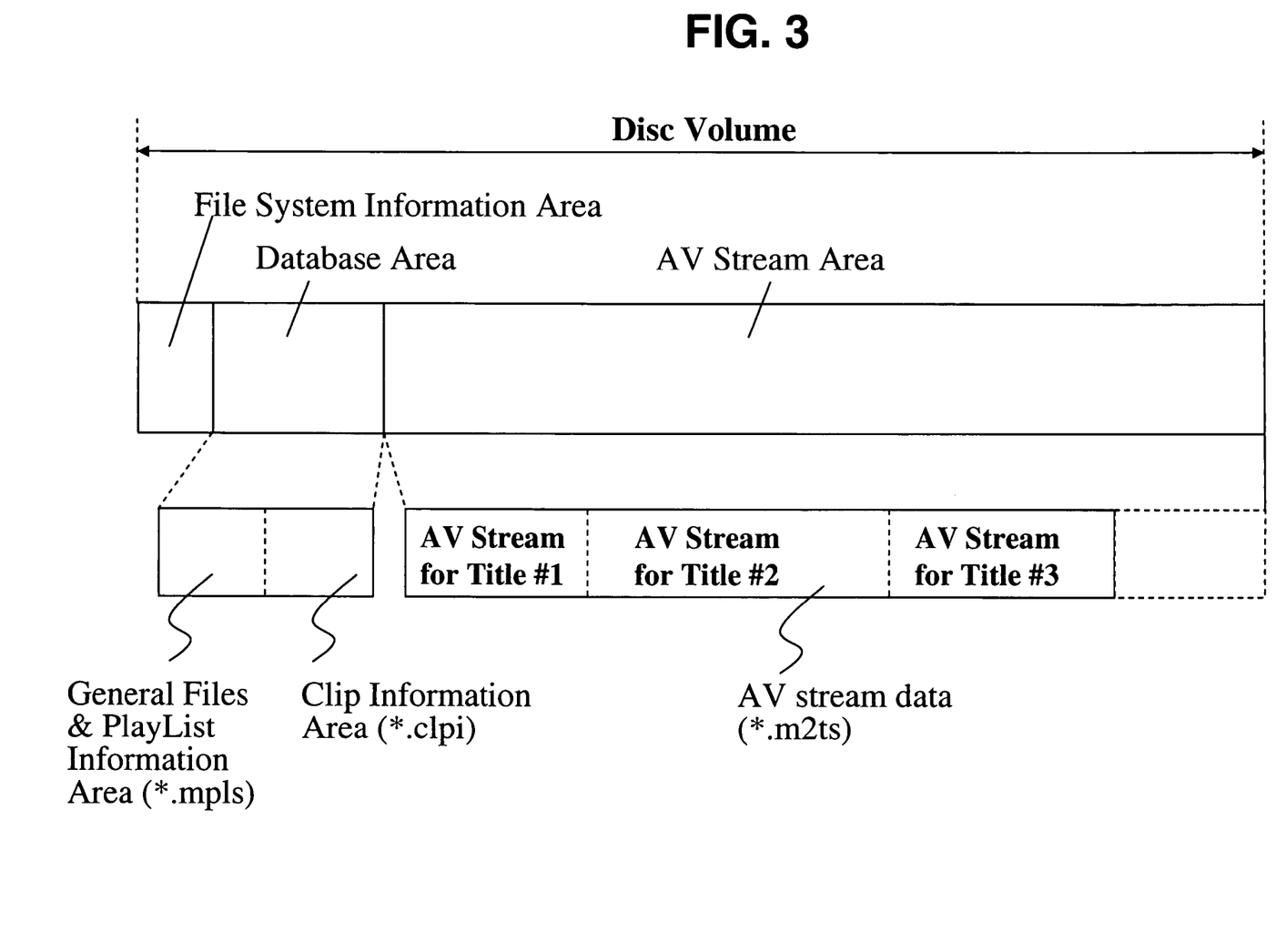
FIG. 3 illustrates an example of a recording medium having the data structure of FIG. 2 stored thereon.

In addition to illustrating the data structure of the recording medium according to an embodiment of the present invention, FIG. 2 represents the areas of the recording medium. For example, the general information files are recorded in one or more general information areas, the playlist directory is recorded in one or more playlist directory areas, each playlist in a playlist directory is recorded in one or more playlist areas of the recording medium, etc. FIG. 3 illustrates an example of a recording medium having the data structure of FIG. 2 stored thereon. As shown, the recording medium includes a file system information area, a data base area and an A/V stream area. The data base area includes a general information file and playlist information area and a clip information area. The general information file and playlist information area have the general information files recorded in a general information file area thereof, and the PLAYLIST directory and playlist files recorded in a playlist information area thereof. The clip information area has the CLIPINFO directory and associated clip information files recorded therein. The A/V stream area has the A/V streams for the various titles recorded therein.

Video and audio data are typically organized as individual titles; for example, different movies represented by the video and audio data are organized as different titles. Furthermore, a title may be organized into individual chapters in much the same way a book is often organized into chapters.

Because of the large storage capacity of the newer, high-density recording media such as BD-ROM and BD-RE optical disks, different titles, various versions of a title or portions of a title may be recorded, and therefore, reproduced from the recording media. For example, video data representing different camera angles may be recorded on the recording medium. As another example, versions of title or portions thereof associated with different languages may be recorded on the recording medium. As a still further example, a director's version and a theatrical version of a title may be recorded on the recording medium. Or, an adult version, young adult version and young child version (i.e., different parental control versions) of a title or portions of a title may be recorded on the recording medium. Each version, camera angle, etc. represents a different reproduction path, and the video data in these instances is referred to as multiple reproduction path video data.

Because of the large storage capacity of the newer, high-density recording media such as BD-ROM still images or pictures may be recorded and reproduced in an organized and/or user interactive fashion, for example, as slideshows.

Figure 4:
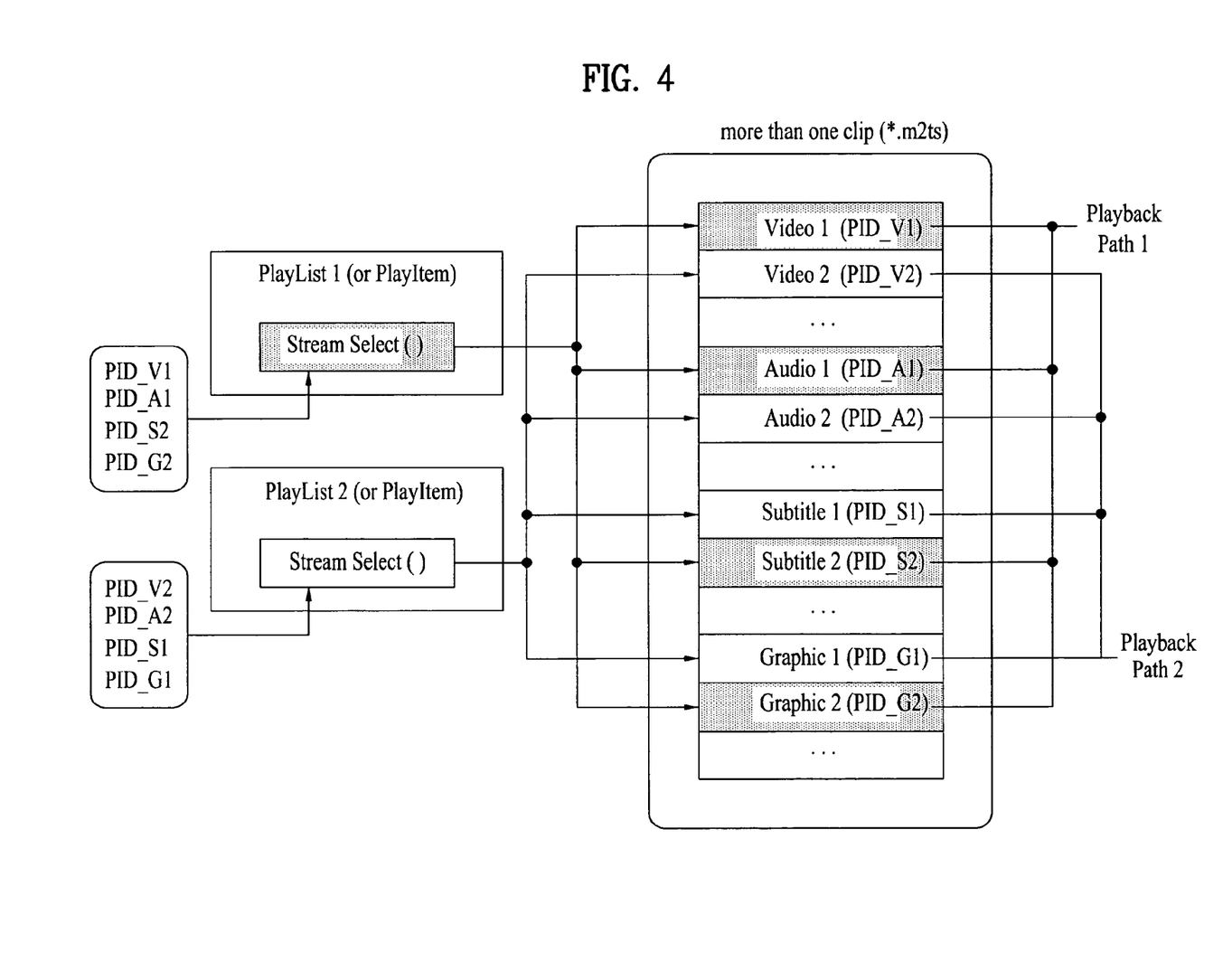
FIG. 4 illustrates a detailed embodiment of portions of the data structure in FIG. 1 and a method for managing still images of a high-density recording medium according to the present invention.

FIG. 4 illustrates an embodiment of a data structure and method for managing data streams of a high-density recording medium such as a BD-ROM. As shown, various component or elementary data streams such as video, audio, subtitle, and/or graphic data recorded on the BD-ROM may be stored and managed as clip files. The example embodiment of FIG. 4 further shows that the component data streams may also represent multiple reproduction paths such as a multi-story, multi-parental, multi-angle data stream, etc. However, it should be understood that the data streams in the present invention may not necessarily represent multiple reproduction paths.

An elementary or component data stream comprises a series of MPEG 2 transport stream packets. The video data, audio data, subtitle data, and/or graphic data may be recorded in the corresponding clip files in a multiplexed manner, in an interleaved manner, or sequentially. Each of the MPEG 2 transport stream packets has a unique packet ID (PID) for identifying the data that the packet delivers.

For example in FIG. 4, MPEG 2 transport stream packets carrying the first reproduction path video data and the second reproduction path video data have unique PID values 'PID_V1' and 'PID_V2', respectively. Likewise, MPEG 2 transport stream packets carrying the first reproduction path audio data and the second reproduction path audio data have unique PID values 'PID_A1' and 'PID_A2', respectively.

The MPEG 2 transport stream packets carrying the first reproduction path subtitle data and the second reproduction path subtitle data have unique PID values 'PID_S1' and 'PID_S2', respectively. Similarly, MPEG 2 transport stream packets carrying the first reproduction path graphic data and the second reproduction path graphic data have unique PID values 'PID_G1' and 'PID_G2', respectively.

The data streams may be associated with a plurality of playlists or playitems. For example, the association of the data streams with playlists and/or playitems may depend on the reproduction path, type of data in the data stream, etc. To this end, a playitem and/or playlist according to an embodiment of the present invention such as shown in FIG. 4 includes a stream indication field called stream select by which various data streams are associated with the playitem or playlist. Namely, the stream select field indicates the PID values of the component streams in a clip associated with the playitem and/or playlist. For example, FIG. 4 shows that for the first playitem or playlist (PlayList 1), the stream select field indicates the PID values 'PID_V1, PID_A1' of the first reproduction path video and audio streams and PID values 'PID_S2, PID_G2' of the second reproduction path subtitle and graphic data streams. FIG. 4 also shows an example of the stream select field of a second playitem and or playlist (PlayList 2) that indicates the PID values 'PID_V2, PID_A2' of the second reproduction path video and audio streams and PID values 'PID_S1, PID_G1' of the first reproduction path subtitle and graphic data streams.

As demonstrated by FIG. 4, the stream select fields may indicate the component streams forming a reproduction path from multiple reproduction path data.

Figure 5:
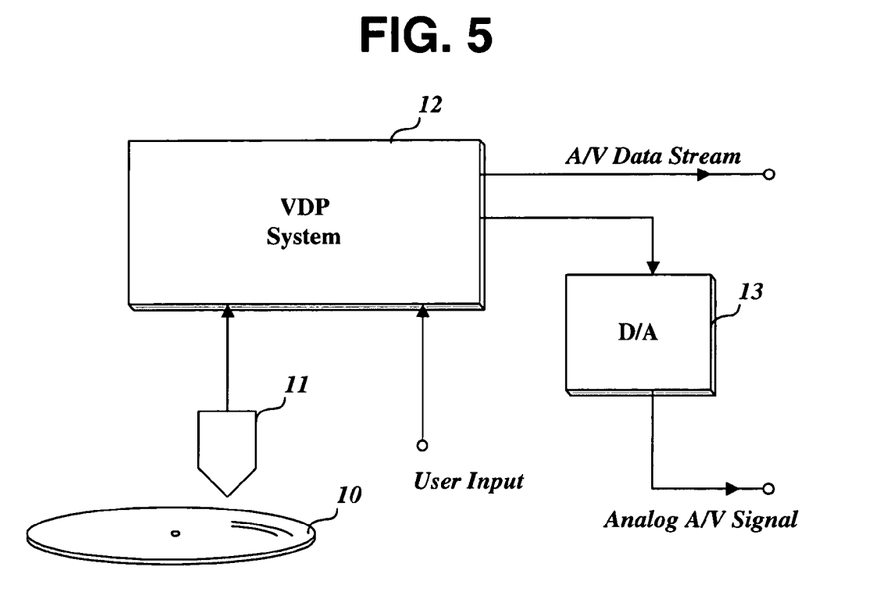
FIG. 5 illustrates a schematic diagram of a partial structure of an optical disc reproducing apparatus where the present invention is applied.

FIG. 5 illustrates a schematic diagram of a partial structure of an optical disc apparatus where the present invention may be applied. As shown, the optical disc apparatus includes an optical pickup 11 for reproducing data from the an optical disk. A VDP (Video Disc Play) system 12 controls the reproduction operation of the optical pickup 11 and demodulates the data reproduced by the optical pickup 11. The VDP system 12 produces an AV stream, which may also be fed to a D/A converter 13 to generate an analog version of the AV stream.

The VDP system 12 controls the optical pickup 11 and demodulates the reproduced data based on user input received from a user interface and the navigation and management information recorded on the optical disk in accordance with the present invention. For example, the VDP system 12 consults the navigation information recorded in the stream select field of the playitem and/or playlist.

Figure 6:
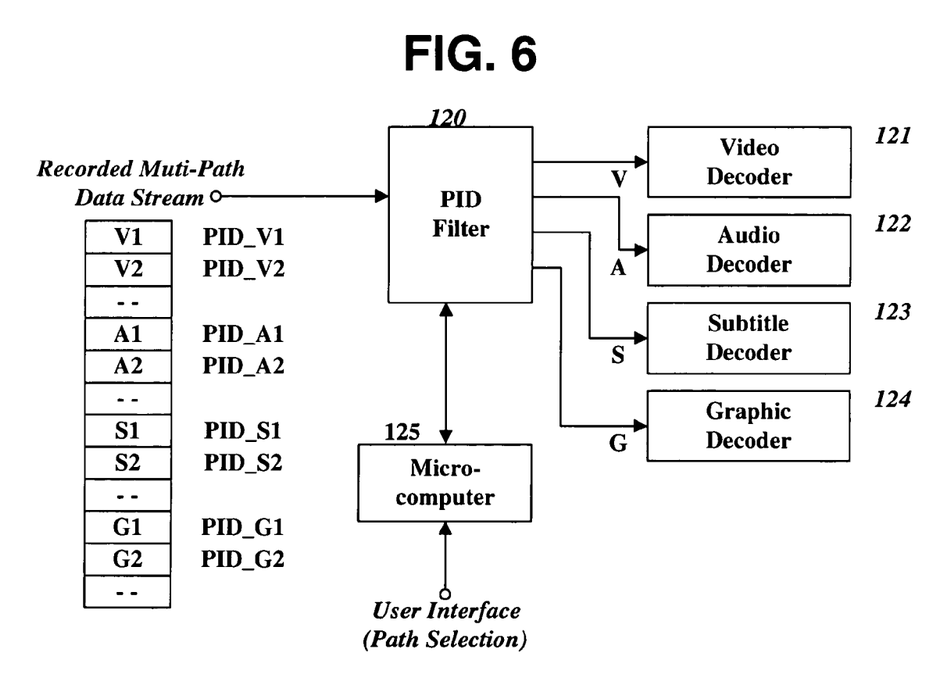
FIG. 6 illustrates a detailed block diagram of the VDP system in FIG. 5.

FIG. 6 illustrates a detail block diagram of the VDP system 12 in FIG. 5. As shown, the VDP system 12 may comprise a PID filter 120, a video decoder 121, an audio decoder 122, a subtitle decoder 123, a graphic decoder 124, and a microprocessor 125. Upon receiving a request to play, for example, the first reproduction path data stream, the microprocessor 125 searches for the first playitem and/or playlist (PlayList 1) associated with the first reproduction path and checks the PID values indicated by the stream select field of the located playitem and/or playlist.

Then, the microprocessor 125 sets up the PID filter 120 in such a way that the PID filter 120 filters the reproduced MPEG 2 transport packets to pass only those having PIDs indicated by the select stream field of the first playitem or playlist (e.g., PID_V1, PID_A1, PID_S2, PID_G2 as shown in FIG. 4). The extracted packets of, for example, video data, audio data, subtitle data, and graphic data are output to the video decoder 121, audio decoder 122, subtitle decoder 123, and graphic decoder 124, respectively.

The video decoder 121, audio decoder 122, subtitle decoder 123, and graphic decoder 124 output decoded data streams, thereby selectively playing the data streams indicated by the select stream field of the first playitem and/or playlist.

In another embodiment of the present invention, the stream select field of the playlist or playitem may contain a path number such as an angle number, a story number, a parental number, or etc. of a desired play-path instead of PID values.

According to at least one embodiment of the present invention, the stream select field may be used to specify or indicate one reproduction path from component data streams representing multiple reproduction paths. However, the present invention is not limited to multiple reproduction path applications.

Figure 7:
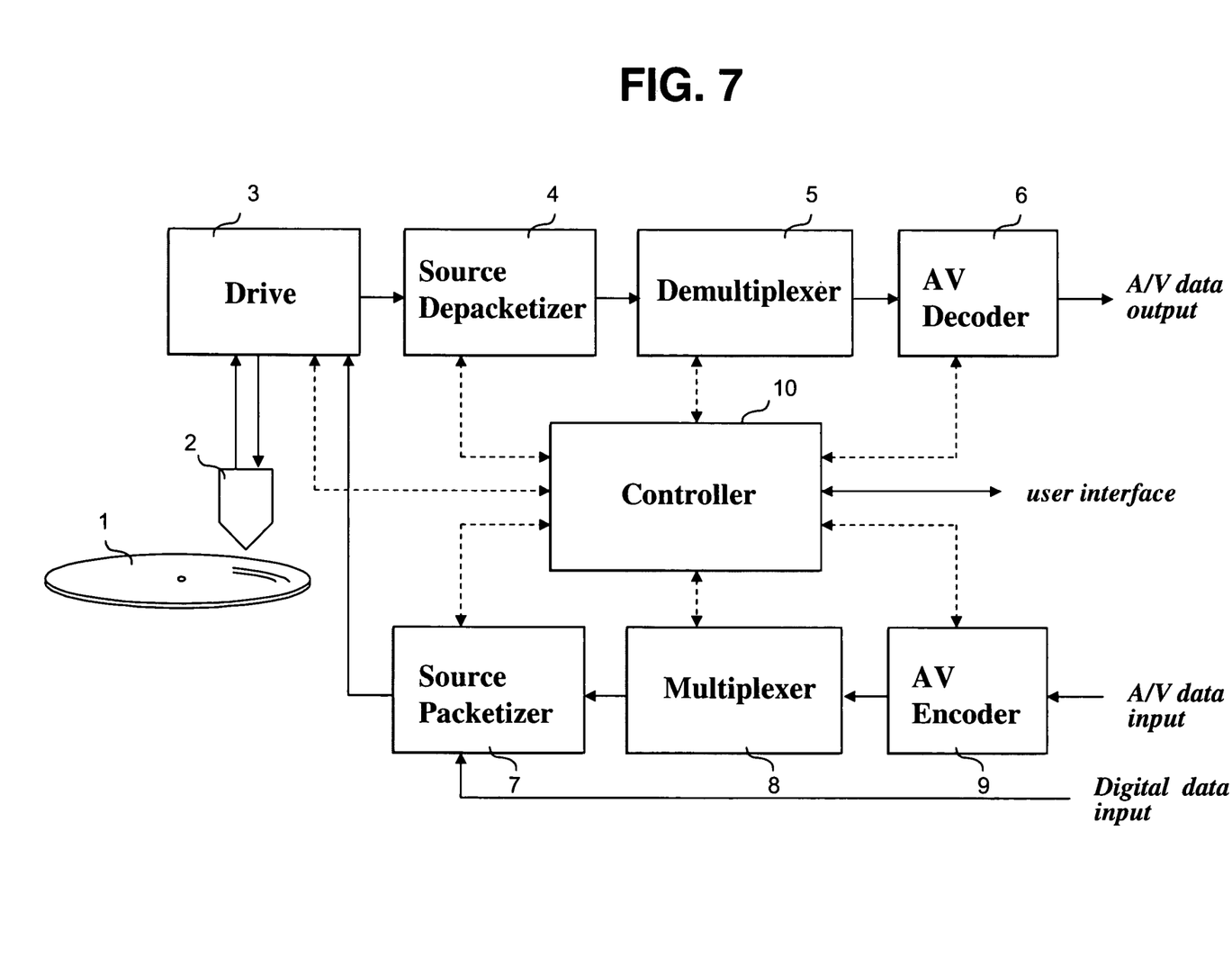
FIG. 7 illustrates an embodiment of a recording and reproducing apparatus according to the present invention.

FIG. 7 illustrates a schematic diagram of an embodiment of an optical disk recording and reproducing apparatus according to the present invention. As shown, an AV encoder 9 receives and encodes data (e.g., still image data, audio data, etc.). The AV encoder 9 outputs the encoded data along with coding information and stream attribute information. A multiplexer 8 multiplexes the encoded data based on the coding information and stream attribute information to create, for example, an MPEG-2 transport stream. A source packetizer 7 packetizes the transport packets from the multiplexer 8 into source packets in accordance with the audio/video format of the optical disk. As shown in FIG. 7, the operations of the AV encoder 9, the multiplexer 8 and the source packetizer 7 are controlled by a controller 10. The controller 10 receives user input on the recording operation, and provides control information to AV encoder 9, multiplexer 8 and the source packetizer 7. For example, the controller 10 instructs the AV encoder 9 on the type of encoding to perform, instructs the multiplexer 8 on the transport stream to create, and instructs the source packetizer 7 on the source packet format. The controller 10 further controls a drive 3 to record the output from the source packetizer 7 on the optical disk.

The controller 10 also creates the navigation and management information for managing reproduction of the data being recorded on the optical disk. For example, based on information received via the user interface (e.g., instruction set saved on disk, provided over an intranet or internet by a computer system, etc.) the controller 10 controls the drive 3 to record one or more of the data structures of FIGS. 2-4 on the optical disk.

During reproduction, the controller 10 controls the drive 3 to reproduce this data structure. Based on the information contained therein, as well as user input received over the user interface (e.g., control buttons on the recording and reproducing apparatus or a remote associated with the apparatus), the controller 10 controls the drive 3 to reproduce the data from the optical disk. For example, as discussed above with respect to the embodiments of the present invention, data streams are reproduced based on reference to the select stream field of a playitem.

The reproduced source packets are received by a source depacketizer 4 and converted into a data stream (e.g., an MPEG-2 transport packet stream). A demultiplexer 5 demultiplexes the data stream into encoded data. An AV decoder 6 decodes the encoded data to produce the original data that was feed to the AV encoder 9. During reproduction, the controller 10 controls the operation of the source depacketizer 4, demultiplexer 5 and AV decoder 6. The controller 10 receives user input on the reproducing operation, and provides control information to AV decoder 6, demultiplexer 5 and the source packetizer 4. For example, the controller 10 instructs the AV decoder 9 on the type of decoding to perform, instructs the demultiplexer 5 on the transport stream to demultiplex, and instructs the source depacketizer 4 on the source packet format.

While FIG. 7 has been described as a recording and reproducing apparatus, it will be understood that only a recording or only a reproducing apparatus may be provided using those portions of FIG. 7 providing the recording or reproducing function.

The data structure for and method for managing data streams on a high-density optical disk in accordance with embodiments of the present invention allows effective selection and reproduction of component data streams recorded on a high density recording medium such as a BD-ROM.

As apparent from the above description, the present invention provides methods and apparatuses for recording a data structure on a high density recording medium for managing data streams recorded on the recording medium.

The above description further provides methods and apparatus for reproducing data streams recorded on a high density recording medium based on a data structure, also recorded on the high density recording medium, for managing the reproduction of data streams.

While the invention has been disclosed with respect to a limited number of embodiments, those skilled in the art, having the benefit of this disclosure, will appreciate numerous modifications and variations there from. For example, while described with respect to a Blu-ray ROM optical disk in several instances, the present invention is not limited to this standard of optical disk or to optical disks. It is intended that all such modifications and variations fall within the spirit and scope of the invention.

What is claimed is:

1. A optical storage medium, comprising:
    a data area storing a plurality of transport packets of the data streams for a plurality of reproduction paths, the transport packets having respective packet identifiers (PID); and
    a navigation area storing a playlist for managing playback of the data streams, the playlist including a plurality of playitems indicating a playing interval of the data streams, each of the playing intervals including an IN-point and OUT-point indicating positions of the data streams, each of the playitems including a stream indication field indicating the packet identifier (PID) of the transport packets for a reproduction path among the plurality of reproduction paths.

2. The optical storage medium of claim 1, wherein the data streams are elementary data streams.

3. The optical storage medium of claim 1, wherein the data area stores the data streams multiplexed together.

4. The optical storage medium of claim 1, wherein the data streams include video data streams.

5. The optical storage medium of claim 4, wherein the data streams further include at least one of audio data streams, graphics data streams and subtitle data streams.

6. A method of recording data on a recording medium, the method comprising:

recording a plurality of transport packets of the data streams for a plurality of reproduction paths on the recording medium, the transport packets having respective packet identifiers (PID); and recording a playlist including a plurality of playitems indicating a playing interval of the data streams on the recording medium, each of the playing intervals including an IN-point and OUT-point indicating positions of the data streams, each of the playitems including a stream indication field indicating the packet identifier (PID) of the transport packets for a reproduction path among the plurality of reproduction paths.

7. A method of reproducing data a recording medium, the method comprising:

reading a playlist including a plurality of playitems indicating a playing interval of the data streams for a plurality of reproduction paths from the recording medium, each of the playing intervals including an IN-point and OUT-point indicating positions of the data streams, each of the playitems including a stream indication field indicating a packet identifier (PID) of transport packets for a reproduction path among the plurality of reproduction paths; and reproducing a data stream of the transport packets having the packet identifier indicated by the stream indication field from the recording medium.

8. An apparatus for recording data on a recording medium, the apparatus comprising:

a pickup configured to record data on the recording medium; and a controller configured to control the pickup, to record a plurality of transport packets of the data streams for a plurality of reproduction paths on the recording medium, the transport packets having respective packet identifiers (PID), and to record a playlist including a plurality of playitems indicating a playing interval of the data streams on the recording medium, each of the playing intervals including an IN-point and OUT-point indicating positions of the data streams, each of the playitems including a stream indication field indicating the packet identifier (PID) of the transport packets for a reproduction path among the plurality of reproduction paths.

9. An apparatus for reproducing data from a recording medium, the apparatus comprising:

a pickup configured to read data from the recording medium; and a controller configured to control the pickup to reproduce a playlist including a plurality of playitems indicating a playing interval of the data streams for a plurality of reproduction paths from recording medium, each of the playing intervals including an IN-point and OUT-point indicating positions of the data streams, each of the playitems including a stream indication field indicating the packet identifier (PID) of the transport packets for a reproduction path among the plurality of reproduction paths, the controller configured to reproduce a data stream of the transport packets having the packet identifier (PID) indicated by the stream indication field from the recording medium.

10. The optical storage medium of claim 1, wherein the data streams are multi-angle data streams, and the playitem further includes a field indicating an angle number.

11. The method of claim 6, wherein the data streams are multi-angle data streams, and the playitem further includes a field indicating an angle number.

12. The method of claim 6, further comprising:
multiplexing the data streams together.

13. The method of claim 7, wherein the data streams are multi-angle data streams, and the playitem further includes a field indicating an angle number.

14. The method of claim 7, further comprising:
de-multiplexing the data streams stored multiplexed together.

15. The apparatus of claim 8, wherein the controller is configured to control the pickup to record multi-angle data streams in the data area, and the playitem further includes a field indicating an angle number.

16. The apparatus of claim 8, wherein the controller is further configured to multiplex the data streams together.

17. The apparatus of claim 9, wherein the controller is configured to control the pickup to reproduce multi-angle data streams from the data area, and the playitem further includes a field indicating an angle number.

18. The apparatus of claim 9, wherein the controller is further configured to de-multiplex the data streams stored multiplexed together.

* * * * *